United States Patent [19]

Yu et al.

[11] 4,411,785

[45] Oct. 25, 1983

[54] REVERSE OSMOSIS HOLLOW FIBER FILTER ELEMENT

[75] Inventors: Steven P. Yu, Elizabeth; Frank C. Matunas, Point Pleasant; Nikolaus Zwetkow, Maplewood, all of N.J.

[73] Assignee: Ecodyne Corporation, Chicago, Ill.

[21] Appl. No.: 427,864

[22] Filed: Sep. 29, 1982

[51] Int. Cl.³ .............................................. B01D 31/00
[52] U.S. Cl. .............................. 210/321.1; 210/323.2; 210/433.2; 210/491; 210/497.1
[58] Field of Search ........................ 210/636, 652–655, 210/777, 778, 193, 321, 323.2, 333.01, 340, 341, 411, 433.2, 456, 497.1, 500.2, 489–492

[56] References Cited

U.S. PATENT DOCUMENTS

| | | | |
|---|---|---|---|
| 3,455,460 | 7/1969 | Manon et al. | 210/497.1 X |
| 3,462,362 | 8/1969 | Kollsman | 210/636 |
| 3,557,962 | 1/1971 | Kohl | 210/500.2 |

Primary Examiner—David R. Sadowski
Attorney, Agent, or Firm—Dressler, Goldsmith, Shore, Sutker & Milnamow, Ltd.

[57] ABSTRACT

A method and apparatus for removing dissolved solids from a liquid which utilizes the technique of reverse osmosis (RO). The liquid to be treated is directed into a pressure vessel which contains a plurality of filter elements positioned therein. The filter elements have a layer of hollow RO fibers around a center core area such that the liquid flows in a direction from the outside of the filter elements towards the center core areas. Pure permeate liquid permeates into the center bores of the fibers and concentrate liquid passes into the center core areas. The permeate liquid from the center bores passes into longitudinally extending permeate collection channels which communicate with the center bores over substantially the entire length of the layers of hollow RO fibers. Various structural embodiments of the filter elements are disclosed.

The method and apparatus provide for the backwashing of the filter elements when they become fouled. Further, an outer filter septum may be applied around the layers of hollow RO fibers to remove particulate matter which would otherwise foul the hollow RO fibers.

6 Claims, 8 Drawing Figures

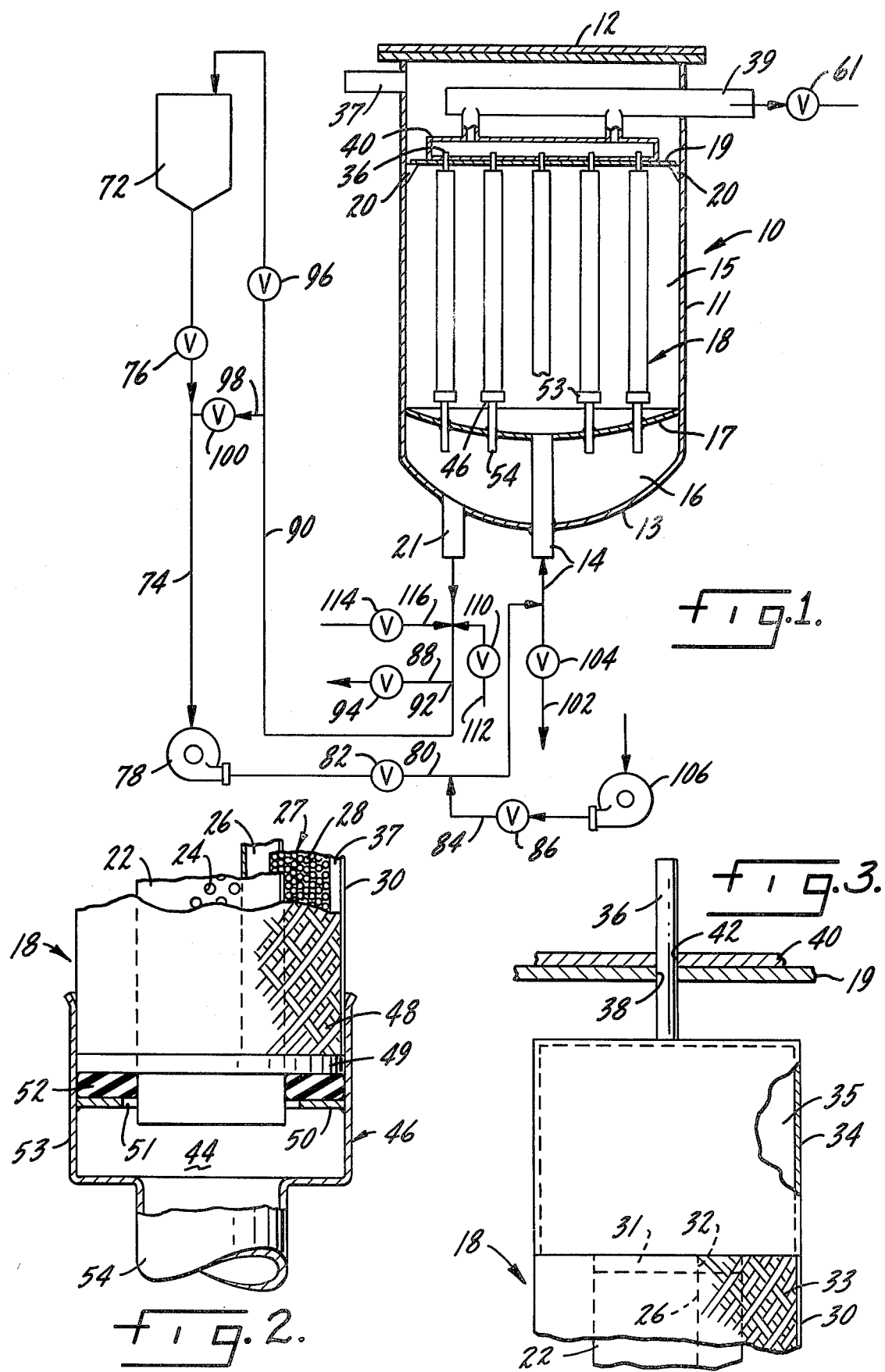

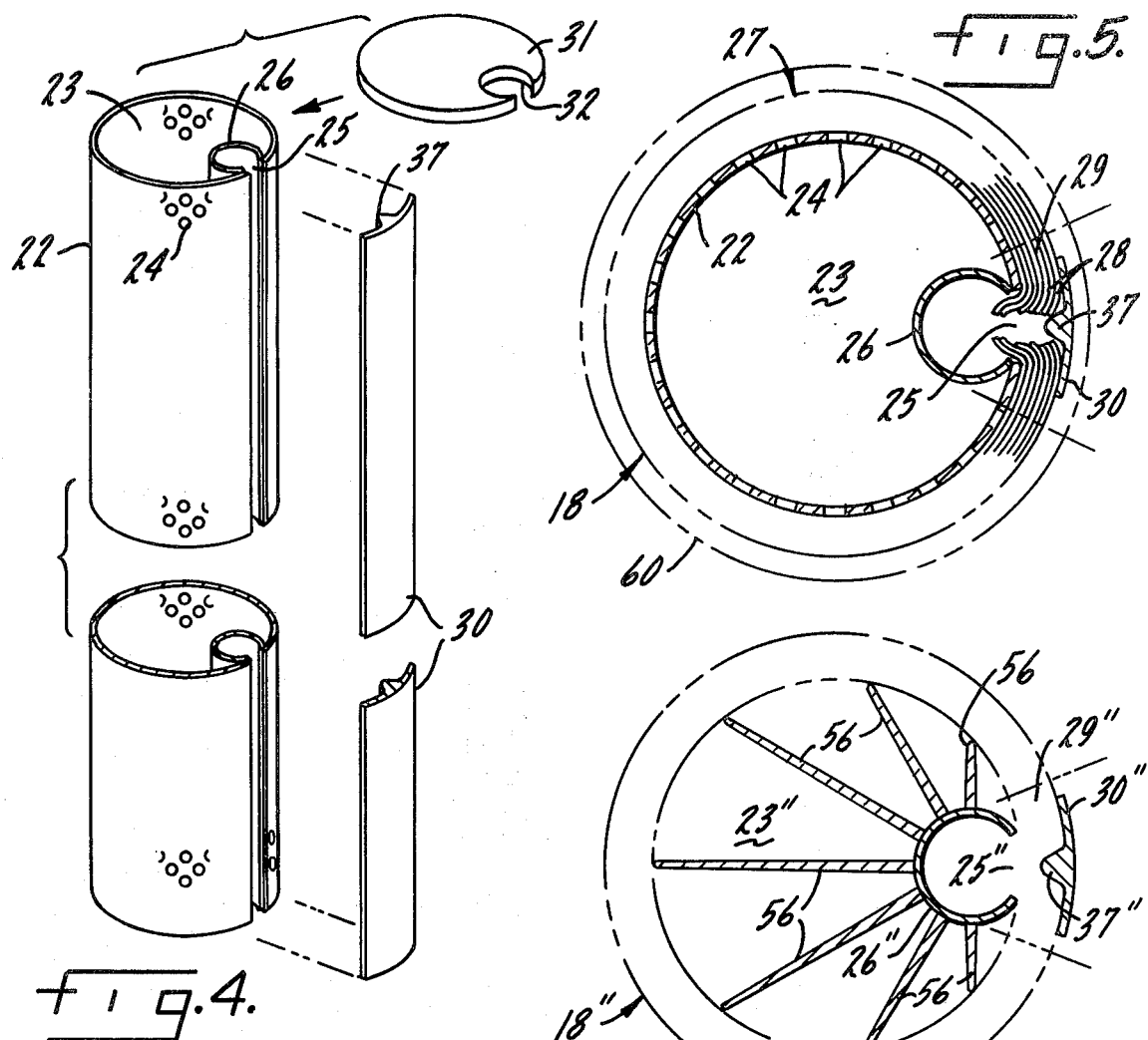
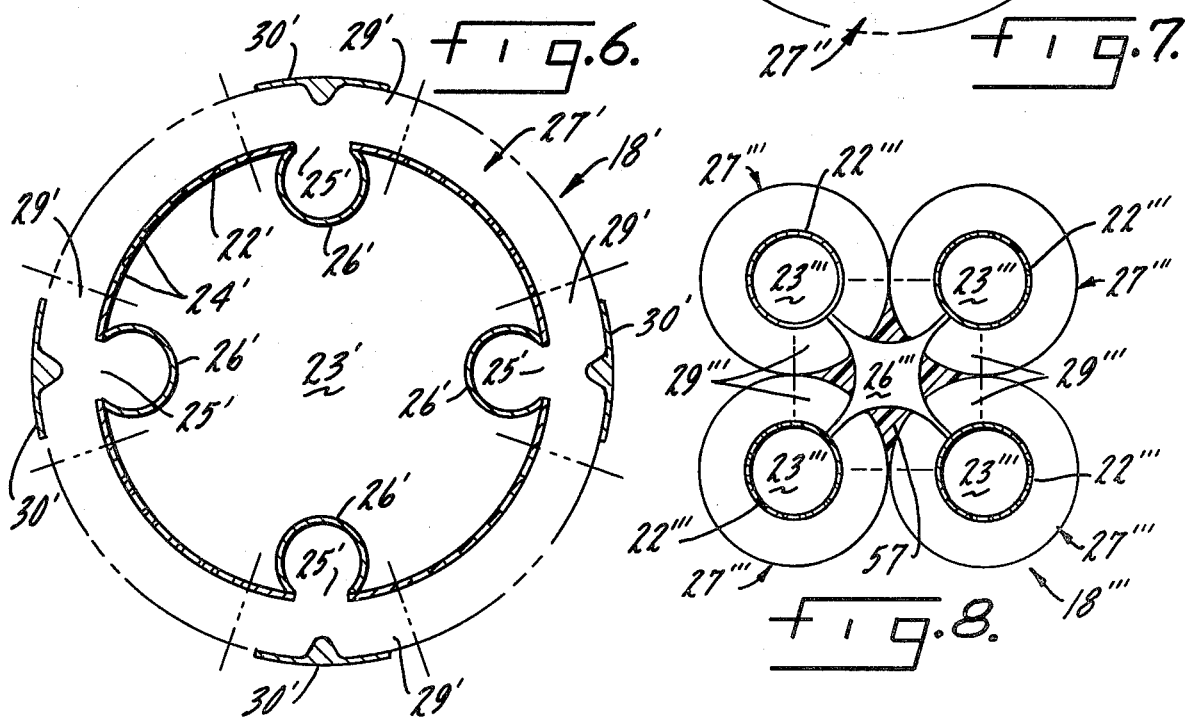

REVERSE OSMOSIS HOLLOW FIBER FILTER ELEMENT

BACKGROUND OF THE INVENTION

The present invention relates to an improved method and apparatus for removing dissolved solids from a liquid. In particular the invention is directed to an improved method and apparatus for treating a liquid which utilizes the techniques of reverse osmosis. The term reverse osmosis be referred to hereinbelow and in the claims as "RO".

In its most basic presentation RO is a membrane process that acts as a molecular filter to remove up to 95–99% of all dissolved minerals, 95–97% of most dissolved organics, and more than 98% of biological and colloidal matter from water. RO can be described as the separation of water from dissolved solids by application of a pressure differential across a membrane which is permeable to water, but not to the dissolved solids. The applied pressure differential must be sufficient to overcome the forces tending to keep the water and dissolved species together. In actual practice, the semi-permeable membrane is contained in a pressure vessel which is compartmentalized by the presence of the membrane. A concentrated solution is introduced under pressure to one side of the membrane and the solvent (water) passes through the membrane. As the solvent is separated from the solution, the solution becomes more and more concentrated. In order to maintain a continuous process, the highly concentrated solution must be drawn off.

The most basic problem in designing an RO device, or a piece of apparatus to use the semi-permeable membrane, is how to package a thin membrane. Flow of water through the membrane is directly proportional to the area of the membrane and inversely proportional to the thickness. Therefore, it is obviously desirable to find some means of packaging the greatest possible area of the thinnest possible membrane. This consideration, and numerous others of varying degrees of importance, have led to the design of three types of RO devices in current use today; the tubular device, the spiral wound device, and the hollow fine fiber device.

The tubular device comprises a semi-permeable membrane which is either inserted into, or coated onto, the surface of a porous tube, which is designed to withstand the operating pressure. Feed water under pressure is introduced into the end of the tube, and the product water permeates through the membrane and the tube, and is collected on the outside. The reject or concentrate exits from the far end of the tube. Although this type of RO device achieved some degree of commercial success, especially in non-water applications such as chemical separations and food and drug processing, the cost of such systems is prohibitively expensive for water treating because of the small membrane area per unit volume of container.

The spiral wound device comprises a jelly roll like arrangement of feed transport material, permeable transport material, and membrane material. At the center of the roll is a perforated permeate collector tube. Several rolls are usually placed end to end in a long pressure vessel. Feed water enters one end of the pressure vessel and travels longitudinally down the length of the vessel in the feed transport layer. Direct entry into the permeate transport layer is precluded by sealing this layer at each end of the roll. As the water travels in a longitudinal direction, some of its passes in the radial direction through the membrane into the permeate transport layer. Once in the transport layer, the purified water flows spirally into the center collection tube and exits the vessel at either end. The concentrated feed continues along the feed transport material and exits the vessel on the opposite end from which it entered.

The hollow fine fiber device comprises a bundle of porous hollow fine fibers. These fibers are externally coated with the actual membrane and form the support structure for it. The hollow fibers are assembled in a bundle lengthwise within a pressure vessel. Feed water under pressure enters the pressure vessel through a highly porous distributor located at the center of the hollow fiber bundle. The distributor runs the entire length of the pressure vessel. Water moves radially outward from the distributor towards the outer shell of the vessel, still essentially at feed pressure. The pressure forces the pure water through the fiber walls into the center bore of the fiber, and this water moves along the center bore of each fiber to a tube sheet end, where the fibers have been set in epoxy and cut to allow the pure water to exit. The salts, minerals, and other contaminants remaining in the water move to the outer perimeter of the vessel and are taken out of the vessel through a reject brine port. The fibers at this end are sealed. A hollow fiber membrane allows one to pack the maximum amount of membrane surface area into a given vessel. Accordingly, such devices are more compact than the other devices.

It is the primary function of RO devices to remove dissolved species, and the heretofore designs of RO modules have been optimized to do so in the absence of appreciable quantities of larger suspended material. These larger particles tend to clog the filter surface or the waste stream channels and thereby foul the RO module. It has therefore been the heretofore practice to use conventional filtration and polishing pretreatment equipment to remove suspended matter from the feed water prior to entry into the RO system. The specific pretreatment requirements are determined dependent upon the particular characteristics of the feed water.

It has long been recognized that hollow fiber RO elements are easily fouled due to particulate matter in the feedstream and the precipitation of salts in areas of low flow velocity. This is primarily due to poor flow distribution and the filtering action of the fiber bundle. In current hollow fiber RO elements the feedstream is introduced through a central perforated tube which permits the feedstream to migrate radially outward to the pressure vessel circumference. During this migration, the velocity of the feedstream is reduced due to the removal of permeate and the increasing diameter of the fiber bundle. Current hollow fiber RO devices make no attempt to prefilter the feedstream within the RO pressure vessel. Further, once the current elements have become fouled in the aforementioned manner, the lack of good flow distribution in any direction materially hinders any form of efficient cleaning of the fiber bundle. As hereinabove mentioned, all attempts to remedy this situation have centered on external filtering techniques to reduce the concentration of particulate matter in the entering feedstream.

A method and apparatus for utilizing hollow RO fibers has been proposed which results in much improved flow distribution and permits the use of various cleaning techniques to increase the useful life of the hollow RO fibers. This method and apparatus further combines the functions of filtration and reverse osmosis in a single pressure vessel which reduces space requirements and equipment costs. This method and apparatus is disclosed in U.S. patent application Ser. No. 427,863 filed Sept. 29, 1982, and assigned to the same asssignee as the present invention.

The invention disclosed in this application includes the passing of the feedstream into a pressure vessel which contains a plurality of filter elements positioned therein. The filter elements have hollow RO fibers wound around foraminous center cores such that the feedstream of liquid to be treated flows in a direction from the outside of the filter elements towards the center cores. In such a manner the substantially pure permeate liquid passes into the center bores of the fibers and the concentrate liquid passes into the foraminous center cores of the elements. Such portion of the feedstream which reaches the center cores is highly concentrated due to the permeation of some of the feedstream into the hollow fibers. This flow pattern minimizes the loss of concentrate velocity due to the removal of the permeate flow by a compensating reduction in area. That is, the surface area of the cylindrical filter elements decrease from the outside to the central core. That portion of the feedstream flow which permeates the hollow RO fibers travels within the center bores thereof and is directed into collectors and removed from the pressure vessel. The concentrated portion of the feedstream flow which reaches the center cores of the elements flows through open ends of the cores and is collected for either removal from the pressure vessel or re-introduction through the elements for further concentrating.

This invention further contemplates the periodic backwashing of the filter elements when they become fouled. The elements are backwashed by directing a backwash medium therethrough in a reverse direction as the normal flow. That is, the backwash medium flows into the center cores and outwardly through the hollow RO fibers. The backwash medium may be either liquid or gaseous or a combination of both. The nature of the design of the apparatus permits the use of various known backwashing techniques.

This invention also contemplates applying an outer filter layer around the layer hollow RO fibers of the elements to remove particulate matter which would otherwise foul the hollow RO fibers. The outer filter septum may be of an inert fibrous material, of a type generally known in the filtration art, or may be a layer of precoat materials, of a type generally known in the art. In either case, the feedstream liquid initially passes through the outer filter septum whereupon the particulate matter and some of the other impurities are removed prior to reaching the hollow RO fibers.

SUMMARY OF THE INVENTION

The present invention is directed to an improved method and construction of the filter elements which are supported in the pressure vessel of a system of the type disclosed in the above referenced patent application. In particular, the improved method and filter element embodiments of the present invention are designed to reduce pressure drop through the RO fibers by utilization of a short unit RO fiber length. This results in a more thorough utilization of the hollow RO fibers and permits the construction of filter elements of greater length.

Briefly stated, the method of the present invention provides for the receipt of the treated liquid from the center bores of the hollow RO fibers into at least one permeate channel, which is in communication therewith, over substantially the entire length of the hollow RO fibers. In so doing, the distance which the treated liquid must travel in the center bores of the hollow RO fibers is materially reduced, which effectively increases fiber utilization. Accordingly, the length of the filter element and the cross-sectional area of the layer of hollow RO fibers are not restricted.

In accordance with a first preferred embodiment of the filter element, the element includes a foraminous center core with a permeate collection channel formed therein. The center core is formed with a longitudinally extending opening in direct communication with a layer of hollow RO fibers which is wound around the center core. An epoxy resin material is applied to the section of the fibers covering the opening and a permeate collection baffle plate is affixed in covering relation to the longitudinally extending opening in the center core. The section of hollow RO fibers in radial alignment with the opening is faced to reveal open ends thereof in communication with the interior of the permeate collection channel. In so doing, the treated liquid within the center bores of the hollow RO fibers flows into the permeate collection channel. An additional layer or layers of inert fibrous material and/or precoat filter aid materials may be applied over the layer of hollow RO fibers to improve flow characteristics and to serve as a filter septum. The upper end of the center core is closed off and the upper end of the permeate collection channel is in open communication with a permeate collection area immediately thereabove. The lower end of the permeate collection channel is closed off and the lower end of the center core is in open communication with a concentrate liquid collection area immediately therebelow.

A second preferred embodiment of the filter element is disclosed which includes a permeate collection channel having a longitudinally extending opening formed therein. A plurality of longitudinal plates extend radially outward from the permeate collection channel, each having a width dimension which is less than the width dimension of the adjacent plate as they get closer to the longitudinal opening. The hollow RO fibers are wound around the outer edges of the plates, which serve to support same away from the permeate channel so as to define a center core area therebetween. The hollow RO fibers in contact with the permeate collection channel adjacent to the longitudinal opening are set in an epoxy resin material and faced as with the first embodiment. Similarly, a permeate collection channel baffle plate is affixed in covering relation to the longitudinally extending opening. The upper and lower ends of the element are similar to that as discussed with regards to the first embodiment.

A third preferred embodiment of the filter element is disclosed which includes an enlarged foraminous center core which has a plurality of permeate collection channels formed in communication with corresponding longitudinally extending openings. The hollow RO fibers are wound around the center core, epoxied and faced in a similar manner as with the first embodiment. Likewise, permeate collection baffle plates are provided and the upper and lower ends of the center core and the permeate collection channels are as with the first embodiment.

A fourth preferred embodiment of the filter element is disclosed which includes four filter elements of similar design to the first embodiment which are arranged adjacent one another to share a common permeate collection channel.

Other advantages, objects and features of the present invention will become apparent upon reading the following detailed description of the preferred embodiments in conjunction with the accompanying drawings.

BRIEF DESCRIPTION OF THE DRAWINGS

FIG. 1 is a view, partially in section and partially in schematic, of a filter system in accordance with the present invention;

FIG. 2 is a sectional view, partially broken away, taken through a lower portion of a first preferred embodiment of a filter element constructed in accordance with the invention;

FIG. 3 is a sectional view, partially broken away, taken through an upper portion of the first preferred embodiment of a filter element constructed in accordance with the invention;

FIG. 4 is an exploded perspective view, partially segmented, of a portion of the first preferred embodiment of a filter element constructed in accordance with the invention, with the hollow RO fibers removed;

FIG. 5 is a transverse sectional view taken through a central portion of the first preferred embodiment of a filter element constructed in accordance with the invention;

FIG. 6 is a transverse sectional view taken through a central portion of a second preferred embodiment of a filter element constructed in accordance with the invention;

FIG. 7 is a transverse sectional view taken through a central portion of a third preferred embodiment of a filter element constructed in accordance with the invention; and FIG. 8 is a transverse sectional view taken through a central portion of a fourth preferred embodiment of a filter element constructed in accordance with the invention.

DESCRIPTION OF THE PREFERRED EMBODIMENTS

Referring now to the drawings, and more particularly to FIG. 1, a filtering system which may be employed to carry out the method of the present invention, and utilize the filter elements of the present invention, is generally indicated by the reference numeral 10. The filter device 10 is adapted to receive an influent stream, filter the influent stream, and discharge the filtrate of effluent stream.

The filter device 10 includes a generally cylindrical pressure vessel 11 made of steel or the like having a removable top cover plate 12 and an outwardly convex bottom 13. The filter vessel 11 is divided into an upper influent zone or compartment 15 and a filtrate zone or compartment 16 by a downwardly curved tube sheet plate 17, suitably secured to the interior of the filter vessel 11 by welding or the like. An influent line 14 extends through the bottom 13 of the vessel and communicates with the influent zone 15 so that the influent liquid is passed directly to the influent zone 15. The influent line 14 is attached to the tube sheet plate 17 by welding or the like. In this manner, direct communication between the influent zone 15 and the filtrate zone 16 is precluded.

Mounted within the influent zone 15 are a plurality of filter elements 18, through which the influent stream must pass before exiting from the influent zone 15. The filter elements 18, constructed in accordance with the invention, have lower ends which extend between the bottom tube sheet plate 17 an upper ends which extend through an upper tube sheet plate 19, which is supported on brackets 20, suitably secured to filter vessel 11, as by welding or the like.

Referring to FIGS. 2-5, a first presently considered preferred embodiment of construction of filter element 18 will now be discussed. Filter element 18 includes a hollow foraminous center core 22, defining a center core area 23 and having holes 24 formed therein. Center core 22 is preferably constructed of stainless steel, and the holes 24 are generally asymmetrically spaced. As best seen in FIG. 4, a longitudinally extending opening 25 is formed in center core 22. A permeate collection channel 26 is positioned within center core area 23 in communication with opening 25. Channel 26 preferably extends along the entire length of center core 22 and is welded thereto along the edges defining opening 25.

Referring to FIGS. 2, 3 and 5, a layer 27 of a continuous hollow fine RO fiber 28 is wound around center core 22. Layer 27 is preferably formed by winding a continuous length of hollow RO fiber 28 onto the center core in a helical fashion. Although not specifically shown, hollow RO fibers 28 are asymmetric in that they have a very thin, dense skin at its surface, which inhibits the permeation of impurities but allows the passage of water. Under this skin is a thick porous layer which provides support for the rejecting skin, but because of its high degree of porosity, does not impede the flow of water into its hollow center area or bore. An example of such a material is the B-9 hollow fine fiber permeator manufactured by E. I. duPont de Nemours & Co.

As best seen in FIG. 5, a section of the layer 27 of hollow RO fibers which is generally in radial alignment with opening 25 is indicated between the phantom lines at 29. The hollow RO fibers 28 in section 29 are potted or embedded in a bonding material such as an epoxy resin. The bonding material precludes the passage of liquid through section 29. The hollow RO fibers 28 in section 29 are cut or faced to reveal a plurality of the center bores thereof in communication with permeate collection channel 26 through opening 25. A permeate collection baffle plate 30 is bonded to the outer surface of section 29 in closing relation to the faced hollow RO fibers 28. Baffle plate 30 preferably includes a longitudinally extending rib portion 37 which extends a short distance into the faced portion of section 29.

Referring to FIGS. 3 and 4, the upper end of center core 22 is closed off by a plate 31 suitably secured thereto. Plate 31 is provided with an opening 32 in communication with the upper end of permeate collection channel 26. An upper section 33 of layer 27 of hollow RO fibers is potted or embedded in a bonding material, such as an epoxy resin, which precludes the passage of liquid therethrough. The upper end of filter element 18 is provided with a top cap 34 which defines a permeate collection area 35 therein. The upper end of permeate collection channel 26 is in communication with the lower end of permeate collection area 35. A permeate liquid outlet tube 36 extends upward from the upper end of top cap 34 to direct permeate liquid therefrom. As best seen in FIGS. 1 and 3, the upper end of outlet tube 36 extends through an opening 38 in tube sheet 19 and into a permeate collector manifold 40 supported on tube sheet 19. Manifold 40 is provided with openings 42 to receive the upper ends of the outlet tubes 36 therethrough and is preferably provided with suitable sealing means (not shown). It should be apparent that the only liquid which may enter into manifold 40 is that which passes through the center bores of the hollow RO fibers.

Referring to FIG. 2, the lower end of center core 22 is in open communication with a concentrate liquid collection area 44, defined within a bottom cap or fitting 46. A lower section 48 of layer 27 of hollow RO fibers is potted or embedded in a bonding material, such as an epoxy resin, which precludes the passage of liquid therethrough. Section 48 preferably extends from a short distance above the lower end of center core 22 to a short distance above the upper edge of fitting 46. An annular ring or end plate 49 may be provided below section 48, which is received within fitting 46. An annular ring 50, having an opening 51 therethrough, is secured to fitting 46 and receives the lower end of the center core 22 therethrough. A sealing means 52 is preferably provided between ring 49 and ring 50 to preclude liquid influent from entering into concentrate liquid collection area 44. Fitting 46 is formed with a retaining cup portion 53, which receives the low end of the filter element 18, and a tube portion 54, which extends through and is welded to tube sheet 17. It should be apparent that the only liquid which may pass through fitting 46 into effluent zone 16 is that which passes downwardly through center core 22.

An outlet line 21 is provided through bottom 13 to discharge liquid from effluent zone 16. A treated liquid or permeate line 39 is provided above manifold 40 to receive treated liquid from the manifold and remove same from vessel 11. A suitable vent 37 is also provided adjacent the upper end of vessel 11, of a type well known in the art.

In the operation of the apparatus of FIGS. 1-5, in accordance with the method of the present invention, the feedstream of liquid to be treated is pumped into vessel 11, under pressure, through influent line 14 and is directed into influent zone 15. The pressure within vessel 11 is maintained, in a well known manner, at approximately 250 to 400 psi. The liquid to be treated passes under pressure through the layer 27 of hollow RO fibers of the filter elements 18 and through the holes 24 into the center core 22. During such passage, a portion of the liquid feedstream permeates through the skin portions and porous layers into the center bores of the hollow RO fibers 28. For reasons well known in the reverse osmosis membrane art, the permeate liquid which enters the center bores is substantially free of suspended solids. The permeate liquid then passes through the center bores a short distance and enters the permeate collection channels 26 through the faced ends of the hollow RO fibers. Permeate liquid is directed into channels 26 over substantially the entire length of the layers 27 of hollow RO fibers. The permeate liquid within the channels 26 is then directed upwardly into the permeate collection areas 35 from which it is directed into manifold 40, whereupon it is removed from vessel 11 through outlet line 39 for ultimate use. The portion of the feedstream liquid which reaches the center cores 22 is highly concentrated due to the permeation of some of the feedstream liquid into the hollow RO fibers. This concentrated liquid flows through the lower ends of the center cores 22 into concentrate liquid collection area 44 and then through tube portions 54 into concentrate or effluent zone 16, whereupon it is removed from vessel 11 through outlet line 21. The concentrate liquid may be disposed of or re-introduced into vessel 11 for further concentrating.

As is apparent from the above description, the liquid flow pattern through the filter elements 18 is from the outside of the layer 27 of hollow RO fibers to the inside of the center core 22. This flow pattern minimizes the loss of concentrate velocity due to the removal of the permeate flow by a compensating reduction in filter area. That is, the surface area of the cylindrical element decreases from the outside of the filter element to the center core. This is the reverse of conventional hollow RO fiber arrangements which remove the concentrate from the outside of the fiber bundle, or the cylinder of greatest surface area. Also, in accordance with the improved method and apparatus of the present invention, the distance in which the treated liquid must travel in the center bores of the hollow RO fibers is materially reduced, which results in an increase in fiber utilization. Further, by utilization of a relatively short fiber length, the pressure drop through the fiber is reduced, which permits the construction of filter elements of greater length.

As will be discussed in further detail hereinbelow, the use of various backwashing techniques may be utilized to clean the filter elements 18, when they become clogged with particular matter, by reversing the normal direction of flow through the filter apparatus 10.

Alternative preferred embodiments of the construction of the filter elements 18, which utilize the inventive concepts of the present invention, are shown in FIGS. 6, 7 and 8. The discussion which follows will be specifically directed to the specific structure of the intermediate or treating portions of these elements, it being understood that the upper and lower ends thereof are suitably constructed in a manner similar to that disclosed with regards to the filter element 18, as shown in FIGS. 1-5. Also, corresponding functional portions in these embodiments will be designated by the same reference numeral followed by a specific prime designation.

Referring to FIG. 6, a second preferred embodiment of the construction of the filter element in accordance with the present invention is indicated at 18'. Filter element 18' is of similar construction to filter element 18, except that it is provided with a plurality of permeate collection channels 26' associated with a common foraminous center core 22'. The sections 29' of the layer 27' of hollow RO fibers in radial alignment with the openings 25' are potted or embedded in a bonding material, such as an epoxy resin. The hollow RO fibers in radial alignment with the openings 25' are cut or faced to reveal a plurality of hollow bores in communication with the permeate collection channels 26'. Permeate collection baffle plates 30' are bonded to the outer surface of the sections 29' in closing relation thereto. The operation of filter element 18' is substantially the same as with regards to filter element 18.

Referring to FIG. 7, a third preferred embodiment of the construction of the filter element in accordance with the present invention is indicated at 18''. Filter element 18'' includes a permeate collection channel 26'' having a longitudinally extending opening 25'' formed therein. A plurality of spaced, longitudinal fins or plates 56 extend radially outward from the channel 26''. The width of plates 56 increase as they are further spaced from opening 25''. The layer 27'' of hollow RO fibers is wound around the outer edges of the plates 56 and the portion of the channel 26" adjacent opening 25". The hollow areas between the plates 56 define the center core area 23". The section 29" of the layer 27" of hollow RO fibers in radial alignment with opening 25" is faced to reveal a plurality of hollow bores in communication with the permeate collection channel 26". Permeate collection baffle plate 30" is bonded to the outer surface of section 29" in closing relation thereto. The operation of filter element 18" is substantially the same as with regards to filter element 18. The plates 56 serve the dual purpose of supporting the layer 27" of hollow RO fibers and to further promote a more uniform flow through the filter element.

Referring to FIG. 8, a fourth preferred embodiment of the construction of the filter element in accordance with the present invention is indicated at 18'''. Filter element 18''' is similar in construction to filter element 18, except that it includes a plurality of similar filter elements in communication with a common permeate collection channel 26'''. In the particular embodiment shown, four foraminous center cores 22''', having layers 27''' wound therearound, are positioned adjacent one another such that the outer surfaces of the layers 27''' are in contact with each other. Each of the layers 27''' has a section 29''', which sections are adjacent one another, and are faced to reveal a plurality of hollow bores of the hollow RO fibers. The center area defined between the adjacent layers 27''' is partially filled with a bonding material, as indicated at 57, such as epoxy resin, so as to define a common permeate collection channel 26''' in communication with the faced sections of the hollow RO fibers. The liquid which permeates into the center bores of the hollow RO fibers is directed into the common permeate collection channel 26'''. In all other respects the filter element 18''' function is a substantially similar manner to filter element 18.

The method and apparatus in accordance with the present invention contemplates the addition of an outer filter septum 60 of an inert fiberous material around the layer 27 of hollow RO fibers to serve as an overlay to prefilter the liquid feedstream. Such an overlay serves to remove particulate matter which would otherwise tend to foul the layer of hollow RO fibers. In essence the outer filter septum serves to prefilter the liquid feedstream within the pressure vessel 11, which eliminates the necessity of utilizing external filtering techniques to reduce the concentration of particulate matter. Such a filter septum may be applied to any of the embodiments of the filter element 18 disclosed herein. Further, as will be further discussed hereinbelow, by utilizing various types of well known backwashing techniques, the filter elements may be periodically cleaned of collected particulate matter. Examples of fiberous materials which may be utilized are cellulose or synthetic fibers, and the like. The application of such a prefiltering outer septum upstream of the hollow RO fibers will also increase the life of the filter elements.

The method and apparatus in accordance with the present invention further contemplates that the outer filter septum 60 may comprise a layer of precoat filter aid materials. Examples of precoat filter aid material which may be utilized are diatomaceous earth, cellulose fibers, polyacrylonitrile fibers, ion exchange resins, and the like.

An exemplary system to periodically apply the precoat layer 60 and to backwash the filter elements will now be briefly discussed. Referring to FIG. 1, a liquid slurry of the precoat medium is stored in a precoat tank 72. A slurry line 74, controlled by a slurry valve 76, connects the precoat tank with a slurry pump 78. A transfer line 80 connects the pump 78 with the inlet line 14 of the filter vessel 11. A transfer valve 82, adjacent the pump 78 and the transfer line 80, controls the passage of slurry from pump 78. The feedstream of liquid to be treated enters the filter system 10 through a feed line 84 having an intake control valve 86. The feed line 84 is connected to the transfer line 80 between the control transfer valve 82 and the inlet line 14. The outlet line 21 from the filter vessel 11 is connected to a concentrate outlet line 88 and a precoat return line 90 at a T-junction indicated by reference numeral 92. The concentrate outlet line 88, controlled by control valve 94, is connected to a drain or a suitable recirculation system (not shown). The precoat return line 90 is connected to the precoat tank 72 and has a return valve 96 to control to flow of slurry back to the precoat tank 72. The permeate outlet line 39 is provided with a valve 61 to control the flow through line 39. A bridge line 98, with a bridge valve 100, interconnects the precoat return line 90 and the slurry line 74. A drain line 102, with a control valve 104, communicates with the inlet line 14.

In preparing the filter system 10 for operation the initial step is to precoat the filter elements 18. To this end the filter vessel 11 is filled with water and a slurry of precoat medium is prepared in the precoat tank 72. During the precoating step all the valves are closed, except the slurry valve 76, the transfer valve 82, the return valve 96, and the bridge valve 100. The precoating step is initiated by starting the pump 78, thereby drawing the precoat slurry from the precoat tank 72 and through the slurry line 74 to the pump 78. The slurry is forced by the pump 78 through the transfer line 80 and the inlet line 14 into the filter vessel 11. The pressure of the incoming slurry forces the water in the filter vessel 11 to exit via the effluent zone 16 and the outlet line 21. A first portion of the water enters the precoat tank 72 through the return line 90, and a second portion is delivered to the slurry line 74 through the bridge line 98. As cycling continues the precoat slurry is brought into contact with the upstream surfaces of the filter elements 18. The precoat medium is separated from the slurry and deposited as the precoat layer 60 upon the upstream surfaces of the layers 27 of hollow RO fibers. The slurry is circulated through the filter system in this manner until a sufficient depth of precoat layer is deposited upon the upstream surface of the filter elements 18. The precoat step is terminated by closing the slurry valve 76 and the return valve 96. The filter system 10 is now ready to treat a feedstream of liquid to be treated.

The service run is begun by opening service valve 94 and the intake valve 86. In this manner, untreated liquid enters the filter system 10 through the feed line 84 and passes through the transfer line 80 and the inlet line 14 into the filter vessel 11. A feedstream liquid inlet pump 106 is provided to supply pressure to the liquid feedstream as required to impart the preselected pressure within the filter vessel 11. The pressure of the incoming feedstream liquid forces the liquid through the filter elements 18 and the effluent zone 16 into the outlet line 21. Following the establishment of the service flow, the transfer valve 82 and bridge valve 100 are closed and the pump 78 is stopped.

The treatment of the liquid passing through the filter vessel 11 is as described hereinabove. That is, the feedstream liquid initially passes through the precoat layer 60, which serves as a pretreatment means to remove some of the undissolved impurities prior to its reaching the layers 27 of the filter elements 18. It should be noted, that, to the extent that the precoat layer includes ion exchange particles, dissolved impurities will also be removed from the feedstream liquid. The permeate liquid exits filter vessel 11 through outlet line 23 and the concentrate liquid exits filter vessel 11 through outlet line 21 and line 88.

As the service step continues, a filter cake builds up on and within the precoat layer 60. Eventually the precoat layer 60 and/or the layer 27 of hollow RO fibers will become sufficiently clogged or exhausted and must be backwashed and a new precoat layer 60 reapplied to the filter elements 18. At this time the filtering or service cycle is stopped by closing the inlet valve 86 and the service valve 94. The filter vessel 11 is then cleaned. To these ends, the vent 37 and the drain valve 104 are opened, and water plus a cleaning gas, usually air, are passed into the interior of the filter elements 18 at their lower ends to clean the filter elements 18 progressively from top to bottom. The air is introduced into the interior of the filter elements 18 by opening a valve 110 in the air line 112 communicating with the outlet line 21. At the same time water is introduced into the filter elements 18 by opening a valve 114 in the backwash line 116. Air under pressure and backwash water thereby enter the effluent zone 16 and pass upwardly into the center cores 22 of the filter elements 18. The drain valve 104 is preferably controlled so that the water level falls slowly. The air and water entering the filter vessel 11 therefore tend to pass first through the upper portion of the filter elements 18. As the air and water backwash passes outwardly through the layer 27 of hollow RO fibers, any trapped particulate matter trapped therein will be dislodged and removed, and as the flow continues the precoat layer 60 will be removed in its entirety. After the filter vessel 11 has been drained, the drain valve 104 is closed, and the tank begins to refill with liquid, which passes in reverse flow thorugh the filter elements 18. After the filter vessel fills to a level above the tops of the filter elements 18, the valves 110, 114 in the air line 112 and backwash line 116 are closed, and the backwash water is removed from the vessel 11 by opening the valve 104. The last backwash sequence may be repeated a plurality of times at different flow rates as is necessary to adequately clean the filter elements 18. The backwash valve 114 is opened, and the filter vessel 11 is permitted to fill with water. After the filter vessel 11 has filled, vent 37 and valve 114 are closed, and the filter vessel 11 is now ready for application of a new precoat layer 60, as previously described.

Though the method and apparatus of the present invention has been described as having filter elements positioned vertically in a filter, having a bottom tube sheet, one of ordinary skill in the art could modify the preferred embodiments for use with a top tube sheet. Moreover, though the embodiments hereinbefore described are preferred, many modifications and refinements which do not depart from the true spirit and scope of the present invention may be conceived by those skilled in the art. It is intended that all such modifications be covered by the following claims.

What is claimed is:

1. A filter element to be vertically supported in a pressure vessel which receives a feedstream of liquid to be treated, comprising:
    (a) a vertically extending permeate collection channel means for receipt of a permeate stream thereinto defining an outer surface and a vertically extending length and a longitudinally extending opening formed therein, said permeate collection channel means having a plurality of spaced apart plates defining outer ends remote from said permeate collection channel means and extending radially outwardly from said outer surface of said permeate collection channel and each said plate extending substantially the entire length of said permeate collection channel means;
    (b) an annular layer of hollow RO fiber means wound around said outer ends of said plates and said permeate collection channel for separating said feedstream of liquid passing therethrough into a permeate stream and a concentrate stream and for directing said permeate stream into center bores formed by said annular layer of hollow RO fiber means and for directing said concentrate stream within a center core area defined between said plates;
    (c) said annular layer of hollow RO fiber means having a section in radial alignment with said opening in said permeate collection channel which is embedded in a bonding material and faced to reveal a plurality of said center bores in communication through said opening with said permeate collection channel for directing said permeate stream from said center bores into said permeate collection channel; and
    (d) a permeate collection baffle plate means for closing off the outer surface of the said faced section of said layer of hollow RO fiber means.

2. The invention as defined in claim 1 wherein the radial extent of said plates increases in length as they are further spaced from said opening.

3. The invention as defined in claim 1 further including a filter septum provided around said layer of hollow RO fibers.

4. The invention as defined in claim 3 wherein said filter septum is a layer of inert fiberous materials.

5. The invention as defined in claim 3 wherein said filter septum is a layer of precoat filter aid material.

6. A filter element to be vertically supported in a pressure vessel which receives a feedstream of liquid to be treated, comprising:
    (a) a plurality of parallel, longitudinally extending, spaced apart foraminous center cores positioned in a side by side adjacent relationship to one another;
    (b) an annular layer of hollow RO fiber means wound around each of said center cores for separating said feedstream of liquid into a permeate stream and a concentrate stream such that said permeate stream permeates into center bores formed within the hollow RO fiber means of each said annular layer of hollow RO fibers means and said concentrate stream is received in said center cores;
    (c) each said annular layer of hollow RO fiber means having sections adjacent with each other which extend substantially the entire axial length of said annular layer and are embedded in a bonding material and faced to reveal a plurality of said center bores; and
    (d) a common longitudinally extending permeate collection channel means defined by said adjacent sections of all said annular layers of hollow RO fiber means embedded in said bonding material and said common longitudinally extending permeate channel collection means extending substantially the entire length thereof in communication with said faced center bores for receipt of said permeate feedstream thereinto.

* * * * *